United States Patent [19]
Huber

[11] 3,957,301
[45] May 18, 1976

[54] VEHICLE SUN SHADE
[76] Inventor: Frank J. Huber, 6840 SW. 8th St., Apt. F613, Miami, Fla. 33139
[22] Filed: Mar. 3, 1975
[21] Appl. No.: 554,754

[52] U.S. Cl. ............................. 296/95 R; 135/5 A; 224/42.1 E
[51] Int. Cl.² ............................................ B60J 3/00
[58] Field of Search ............ 296/97 R, 97 A, 97 B, 296/95 R, 136, 137 R; 224/42.1 E, 42.1 R, 42.1 B; 135/5 A, 5 AT

[56] References Cited
UNITED STATES PATENTS

| | | | |
|---|---|---|---|
| 3,476,436 | 11/1969 | Martin | 296/95 |
| 3,486,513 | 12/1969 | Fulsebakke | 135/5 A X |
| 3,652,000 | 3/1972 | Steinhoff | 224/42.1 E X |
| 3,730,196 | 5/1973 | Borskey | 135/5 A |
| 3,876,245 | 4/1975 | Lowery | 296/95 R |

FOREIGN PATENTS OR APPLICATIONS

| | | | |
|---|---|---|---|
| 798,110 | 3/1936 | France | 135/5 A |

Primary Examiner—Robert J. Spar
Assistant Examiner—Donald W. Underwood
Attorney, Agent, or Firm—Malin & Haley

[57] ABSTRACT

A vehicle sun shade or sunscreen which is removeably mounted on the top of a vehicle, such as an automobile or the like, including a rigid frame, front and back collapsible sunscreen panels which cover the front and back vehicle windows and rotate from a shading position into a storage position and a pair of side window screens which are rotatably connected to the frame to move in the plane of the rigid screen from a sunscreen position rotatable into a storage position. The side window screens include a plurality of telescopically adjustable supporting rods. A flexible material is utilized to provide the sunscreen and is attached by suitable clips or brackets, both on the front, rear and side supporting arm members. The sunscreen is collapsible to a storage position to allow access to the vehicle and utilization of the vehicle. The frame may also include support members to be utilized as a storage or luggage rack for the vehicle.

3 Claims, 7 Drawing Figures

VEHICLE SUN SHADE

BACKGROUND OF THE INVENTION

This invention relates generally to a sun shade or sunscreen which is mounted on the roof of a vehicle and more particularly to a vehicle sun shade having a plurality of moveable arm members which are collapsible into a storage position with very little effort.

As is well known, especially in tropical or semi-tropical climates, present day vehicles having large areas of glass are readily heated by the sun's rays, heating the interior of the vehicle by the so-called "hot house" effect. It is not uncommon on summer days to find temperatures inside a closed windowed vehicle reaching 120° Farenheit. Although many vehicles have air conditioning, the tremendous heating effect inside the vehicle by the sun oftentimes negates the effect of the air conditioner requiring several minutes of operation before the interior of the vehicle is sufficiently cooled for the comfort of the passengers and driver. Many devices have been shown in the prior art in an attempt to provide a vehicle sun shade, these devices being characterized by being extremely cumbersome and impractical in operation.

The instant invention provides a compact, easily actuated, foldable vehicle sun shade providing complete sunscreen protection of the vehicle interior when in the non-stored position, while allowing the user to quickly fold and collapse the sunscreen to a stored position to allow the use of the vehicle. The device includes a pair of front and rear rotatable sunscreens for the front and rear windows and a plurality of side telescopically extendable and rotatable sun shade support rods which may be quickly and easily rotated into a parallel relationship with a supporting frame mounted on the roof of the vehicle. The basic supporting frame may also be utilized as a luggage rack or article carrier.

BRIEF DESCRIPTION OF THE INVENTION

A sunscreen or sun shade mountable on a vehicle top including a rigid four-side substantially rectangular frame, a frame support means engageable with the roof of a vehicle for supporting the frame thereupon, a front moveable sun shade panel rotatably connectable along the front frame portion, rotatable from a first position adjacent the window area of the vehicle to a second stored position parallel to the supporting frame, a rear window shade coupled in a similar manner as the front shade foldable into a stored position parallel to the rack and positioned within the rack frame, and a plurality of telescopically adjustable sun shield supporting rods having a moveable hinge portion, said hinge portion allowing the rods to be coupled from an extended vertical position relative to the vehicle and perpendicular to and in the plane of the supporting frame to a position parallel to and adjacent the sides of the supporting frame. The sun shade element itself is comprised of a flexible material which may be buckled and then fastened to the supporting rods by appropriate coupling means. The side supporting rod connectors may be spring actuated and lockable in first and second positions perpendicular to and parallel to the supporting frame structure. The flexible material providing the sun shade may be removed from the frame or may be kept in the stored position attached to the frame supporting rods themselves. The entire supporting frame and sun shades attached thereto are coupled to the roof of a vehicle in a conventional manner similar to luggage racks known today and may include the use of locking clasps which are received in vehicle roof drains along the top of the roof with straps which may be adjustable to tighten the supporting frame on all sides while the frame itself rests on a plurality of rubber cushions engaged with the upper portion of the roof.

In the operational position, with the shades extended to provide sun shade protection to the interior of the vehicle, the front and rear shades are rotated over the window portions while the side shades are rotated from a parallel position, parallel to the supporting frame sides to a perpendicular position extending over the side window portions.

In the storage position, the front and rear sun shades are rotated inwardly and received substantially within the interior of the supporting frame while the side sun shades may be rotated into a parallel position to allow access and use of the vehicle.

It is an object of this invention to provide an improved vehicle sun shade for shading the window area of a vehicle, such as an automobile or the like.

It is another object of this invention to provide a collapsible vehicle sun shade which has a storage position which is easily and readily moveable to an operable position.

But still yet another object of this invention is to provide an improved vehicle sun shade which is attachable to the roof of a vehicle which may also be utilized as a luggage rack.

In accordance with these and other objects which will be apparent hereinafter, the instant invention will now be described with particular reference to the accompanying drawings.

PREFERRED EMBODIMENT OF THE INVENTION

Figure 1:
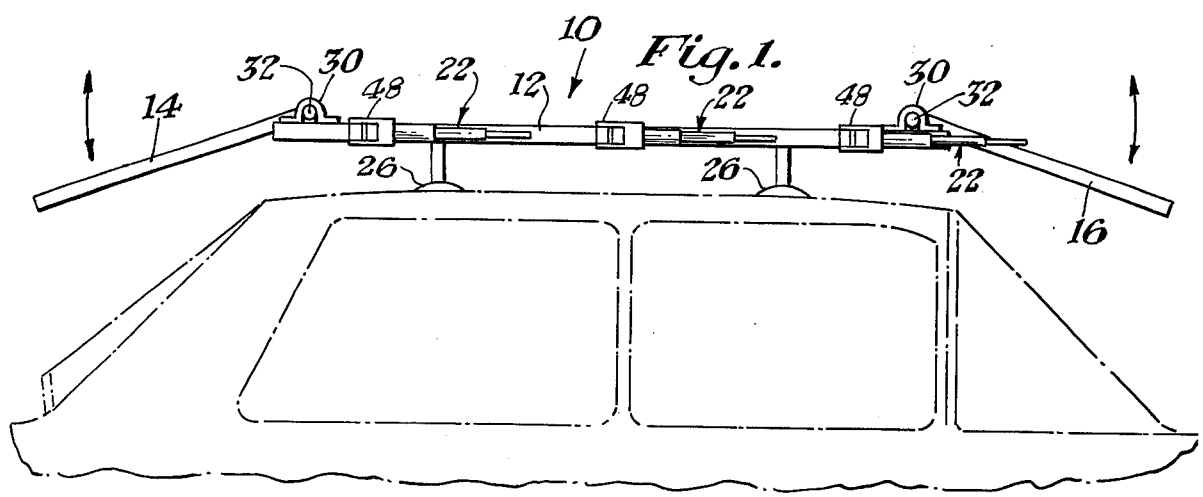
FIG. 1 shows a side elevational view of the instant invention attached to a vehicle roof shown in phantom.

Referring now to the drawings, and especially FIG. 1, the instant invention is shown generally at 10 comprised of a plurality of tubular frame members 12 disposed in a rectangular shape, the frame members acting as the support frame for the entire device and mounted on a vehicle roof by resilient pads 26. Rotatably connected at the front portion of the frame is a front sun shade 16 connected to the frame by adjustable clamps 30. Likewise, at the rear of the frame a rear sunscreen 14 is coupled to the frame by adjustable clamps 30. Connected along the sides of the frame are a plurality of sun shield supporting rods 22 as described below. The side supporting rods 22 are rotatable from the position shown which is perpendicular to the side frame member 12 to a position parallel to frame member 12 and substantially adjacent to the frame side. FIG. 1 is shown without the attachable resilient sunscreen itself which is described below.

Figure 2:
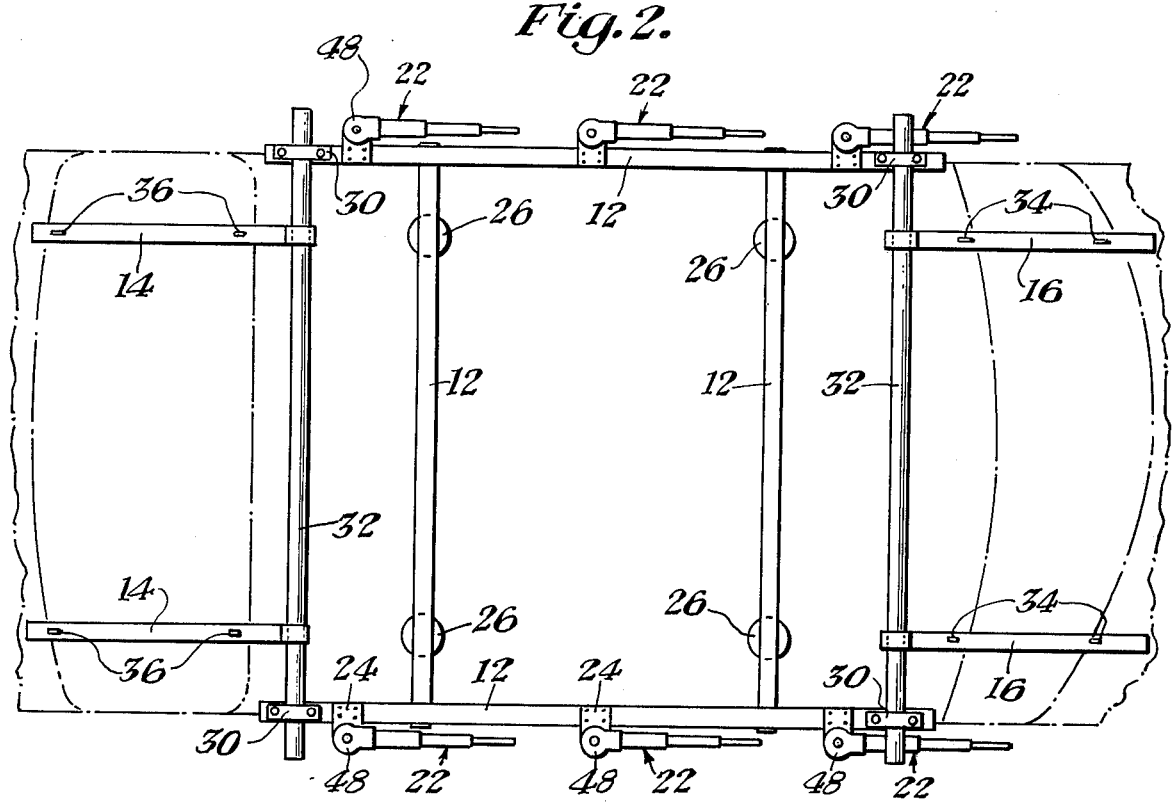
FIG. 2 shows a top plan view of the instant invention as attached to a vehicle roof.

Referring now to FIG. 2, the support frame is shown having transverse frame members 12 connected to the frame supports 26 which may be rubber cushions which engage the roof of the vehicle. The transverse frame members 12 are rigidly coupled to the longitudinally disposed frame members 12 forming a rigid rectangular structure. The frame members themselves may be constructed of a lightweight tubular material of metal or aluminum or the like. A front visor support bar 32 is connected to the front visor support arms 16 having a plurality of flexible material connectors 34 disposed along their longitudinal length to allow the coupling of a flexible material to the arms 16. The arms 16 are coupled at one end rigidly to the transverse visor bar 32 which may be rotated and is coupled to frame members 12 by the clamps 30. The rear visor is likewise constructed having flexible material support arms 14 rigidly connected to the rear transverse bar 32 which is rotatably connected by clamps 30 to the rear portions of supporting frame members 12. Flexible material connectors 36 which may be buckles, clasps or the like are disposed along the longitudinal length of the rear visor support arms 14 to receive and rigidly couple a flexible material which acts as a sun shade to the frame bars 14 themselves. Also shown in the storage or collapsed position are the side flexible material supporting arms 22 which are disposed parallel to the longitudinal frame members 12 and rotatably coupled to frame 12 by bracket 24 which is discussed below. The particular number of side arms 22 employed may be dependent on the size of the vehicle or the like.

Figure 3:
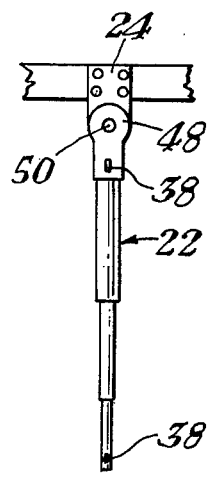
FIG. 3 shows a fragmentary top plan view of the side shade supporting rod and clamping means as connected to a portion of the supporting frame.

FIG. 3 shows one of the supporting arms 22 having a connecting sleeve 48 which is rotatably coupled to bracket 24 by pin 50 allowing the arm 22 to be rotated from a position shown in FIG. 3 perpendicular to frame member 12 to the position shown parallel to frame member 12 in FIG. 2. Fasteners 38 are connected near the ends of arms 22 and to sleeves 48 to couple and hold a flexible material panel (not shown) to the side arms. The support arm 22 may be adjustable in length to provide for the particular length desired along the supporting arm while allowing it to be collapsed in a storage position. The arm 22 has three concentrically arranged sections connected longitudinally with a spring disposed within the entire length of the arm.

Figure 4:
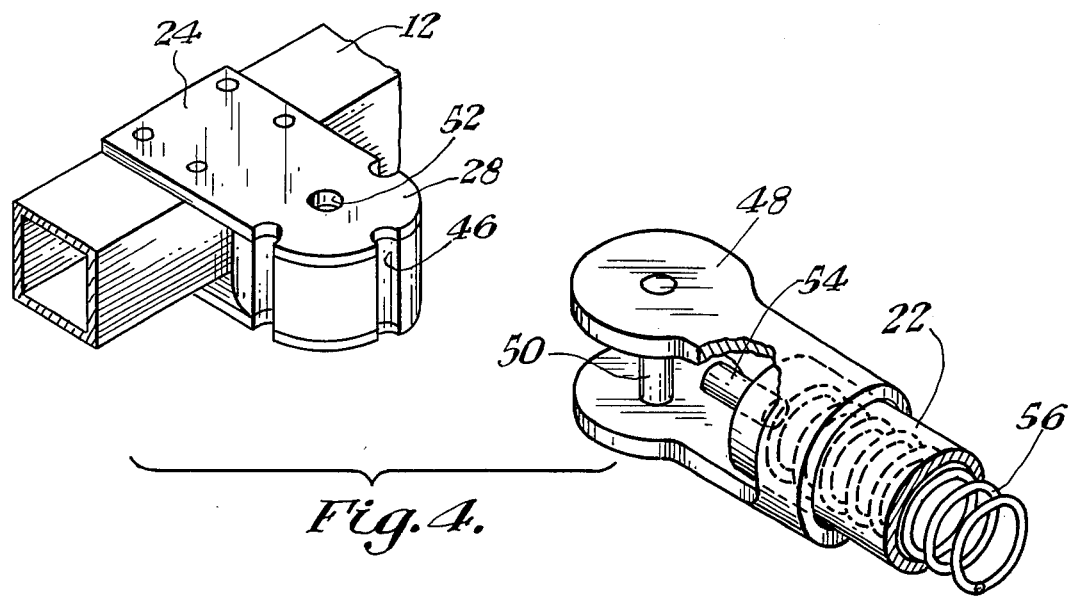
FIG. 4 shows a perspective fragementary view of the side arm clamps as attached to fragmentary portion of the supporting frame.

FIG. 4 shows the side arm frame connector utilized to stabilize the side support arms in a variety of positions either perpendicular to support frame member 12 or substantially parallel to frame member 12 which would be the stored position. The connector includes a receiving body 28 with side plates 24 which are riveted or fastened to frame 12, the body 28 having a plurality of cammed grooves 46 disposed about its outer periphery and an aperture 52 disposed vertically which receives pivot pin 50 for holding the arm 22 which is pivotally coupled to the connector 48, the arm 22 including a spring 56 disposed therein and a plunger 54 which may be received into the camming grooves 46. The spring 56 resiliently holds the plunger in position but allows the entire arm 22 and the sleeve 48 to be rotated about the clamp body 28 providing a positive locking when the plunger 54 is disposed within the camming groove 46.

Figure 5:
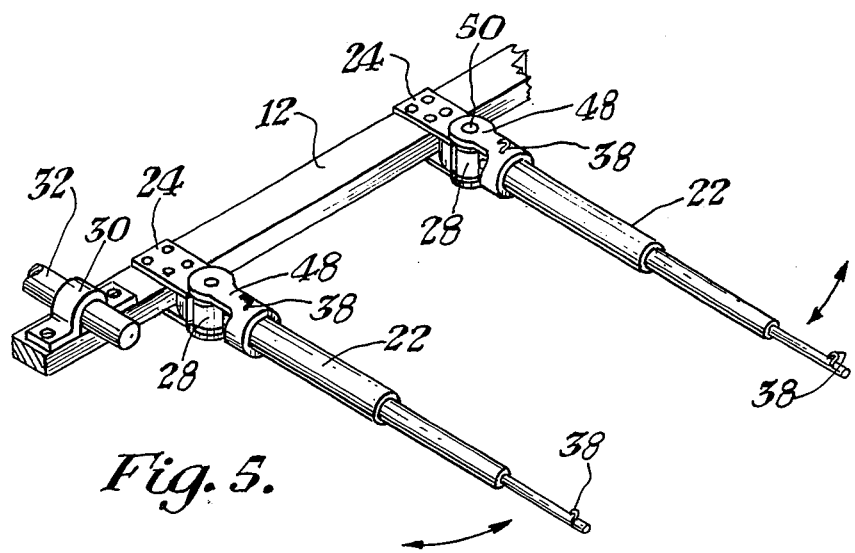
FIG. 5 shows a perspective view of a pair of the side support arms extended in the operating position.

FIG. 5 shows a pair of arms 22 connected to a portion of frame member 12 in perpendicular extended operating position as they would be disposed when the sun shade is extended about the side of a vehicle. In this illustration, the flexible material which acts as a sun shade is not shown for the sake of clarity. The arms 22 are rotatable from the position shown into positions parallel to the frame bar itself. With the material fastened to the arms by fasteners 38 and the resilient telescopic action of the arms necessary to move the arms to a stored position, storage of the side shades are accomplished with the flexible material coupled to the arms 22 by overcoming the cam locking action of the connectors 48 and rotating the bars inwardly toward the frame 12. The flexible material, being coupled to the arms, when moved will cause the telescopic portions of the arms to be pulled in against the spring action collapsing the arms for the stored position whenever the fixed distance between the arms is less than the telescopic length of the arms, as shown in FIG. 5. The material may then be left in position in a stored position along the top of the rack. This obviates the necessity for removing the material each time it is desired to store the sun shade. The action of the arms also prevents damage to the sunscreen if used when the vehicle is in motion in that the striking of an object against the sun shade or the arm members will merely be absorbed by the rotation of the arm members, thus preventing damage to the sun shade. Also shown is a semi-circular hold-down clamp 30 which may be bolted, screwed or fastened to tensionally adjust shaft 32 to the frame member 12 which acts to rotatably coupled shaft 32 to the frame member 12. Clamps 30 are utilized on both the front and rear sun shades to allow rotation of the respective supporting shafts so that the sun shades may be moved from a shading position into a storage position within the frame perimeter. Screws, wing nuts or the like may be used as the clamp coupling means such that the shaft 32 may be locked in position when desired to prevent rotation and upon loosening of clamp 30 will permit rotation of the shaft.

Figure 6:
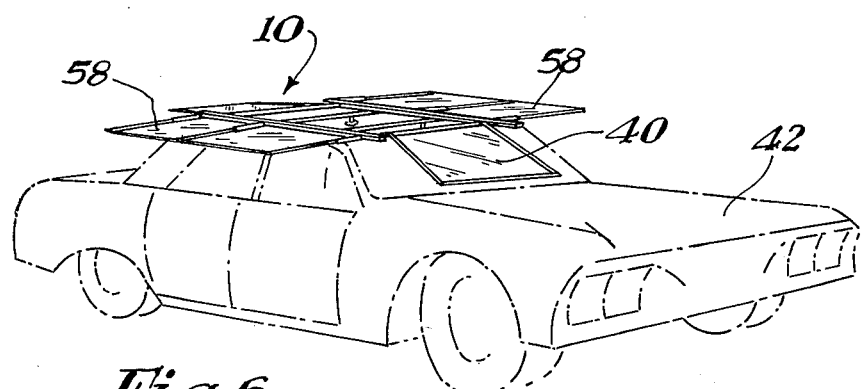
FIG. 6 shows a perspective view of the instant invention as coupled to an automobile in the operational position to provide sunscreening to the vehicle.

FIG. 6 shows the instant invention 10 disposed on a vehicle 42 with the front flexible material panel 40 disposed over the front windshield and side flexible panels 58 disposed over the side windows of the vehicle. This is shown as the operational position of the device. The frame may also be utilized to act as a luggage rack or the like.

Figure 7:
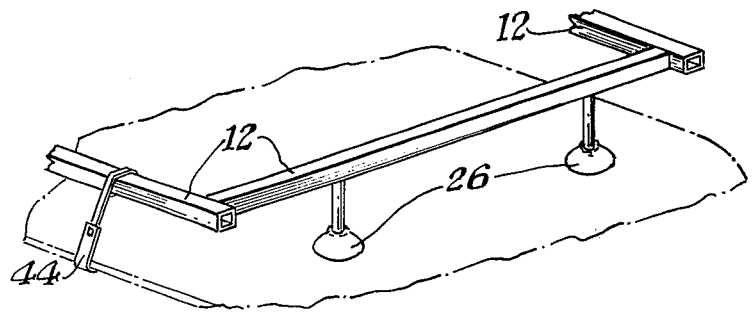
FIG. 7 shows a fragmentary view of the supporting frame and its connection to a vehicle in perspective.

FIG. 7 shows the frame members 12 and their connection to the roof of the vehicle utilizing resilient supporting pads 26 rigidly coupled to the frame 12 while an adjustable strap and hooking clamp 44 is shown which is connected under the water run-off drain found on most vehicle roofs to allow the frame to be rigidly connected to the roof itself. A plurality of connecting straps and clamps 44 are disposed along the lateral sides of the supporting frame.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A sun shade mountable on a vehicle roof comprising:
    a rectangular frame, said frame including a front bar and a parallel opposite rear bar and a pair of side bars perpendicularly connected to said front and rear bars;

a plurality of roof mounted support means connected to said rectangular frame;

means connected to said frame for adjustably connecting and tensioning said frame to said vehicle roof;

a first pair of supporting arms connected to said front bar of said frame, said supporting arms being rotatable from a first position extended outwardly from said frame to a second position within said frame;

a second pair of supporting arms connected to the rear bar of said frame, said second pair of supporting arms being rotatable and lockable from a first position extending outwardly of said frame to a second position within said frame;

a plurality of side supporting arms rotatably coupled to said side bars of said frame, said side supporting arms moveable and lockable from a first position in the plane of said frame perpendicular to said side bars to a second position in the plane of said frame parallel to said side bars; and a flexible sun shading means connected to said first, said second and said side supporting arms.

2. A vehicle sun shade attachable to a vehicle roof comprising:

a rigid rectangular frame, said frame including a front member, a rear member, and a pair of side members perpendicularly coupled to said front and rear members;

a vehicle roof frame mounting means for mounting said frame on the roof of a vehicle;

a front sun shade bar lockably and rotatably connected to the side members of said frame adjacent the front member of said frame, said front sun shade bar including at least two perpendicularly connected arms, each of said arms including plurality of flexible cover connectors;

a rear sun shade bar lockably and rotatably connected to the side members of said frame adjacent the rear frame member, said rear sun shade bar including at least two perpendicular arms attached to said bar, each of said arms including a plurality of flexible sun shade cover connectors attached to said arm;

a plurality of pivotally connected telescopically moveable arms connected to and disposed outwardly of the side members of said frame, each of said side arms being lockable in a first position parallel to said side member in a second position perpendicular to said side member extending outwardly from said side member, each of said side arms including a plurality of flexible cover connectors attached thereto; and a plurality of flexible sun shade covers removeably attachable to said front arms and said rear arms and said telescopically moveable side arms whereby said flexible covers may be disposed in first positions extending horizontally away from the front, rear and sides of said frame and in second storage positions adjacent said frames.

3. A vehicle sun shade, as in claim 2, including:

a plurality of manually actuated locking clamps adjustably connected to said front bar and said rear bar, rotatably connecting said front and rear bars to said side frame members.

* * * * *